Aug. 21, 1962     I. W. LITTLEFIELD     3,050,261
SPRAY PATTERN CONTROL MECHANISM FOR INSECTICIDE SPRAYER
Filed April 24, 1961
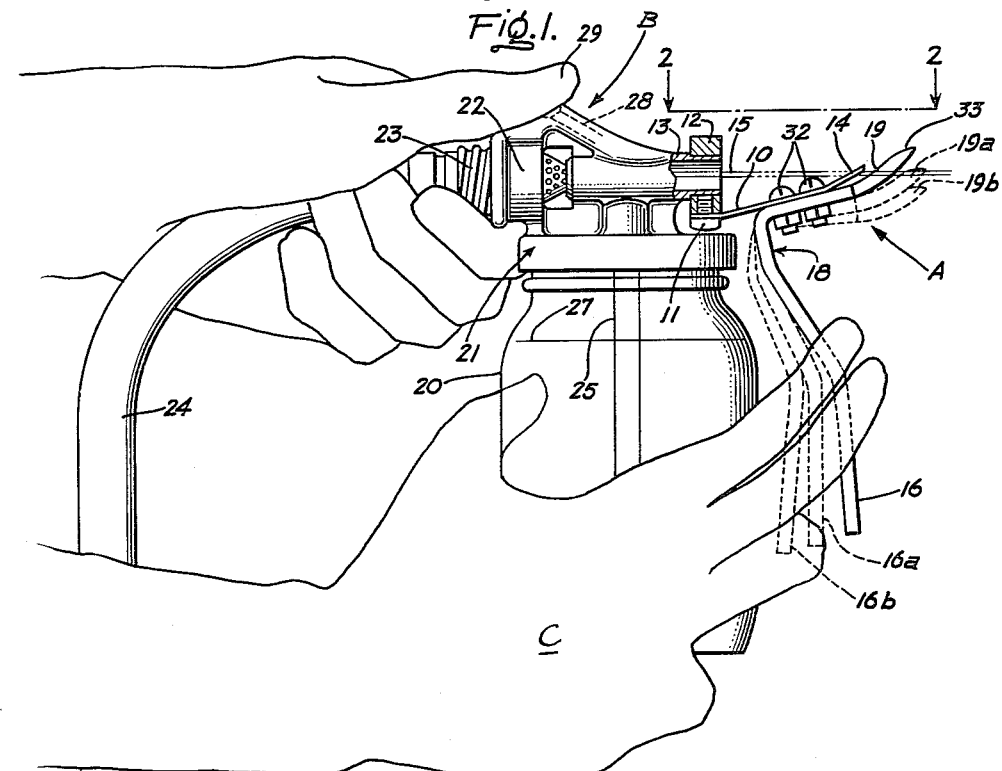
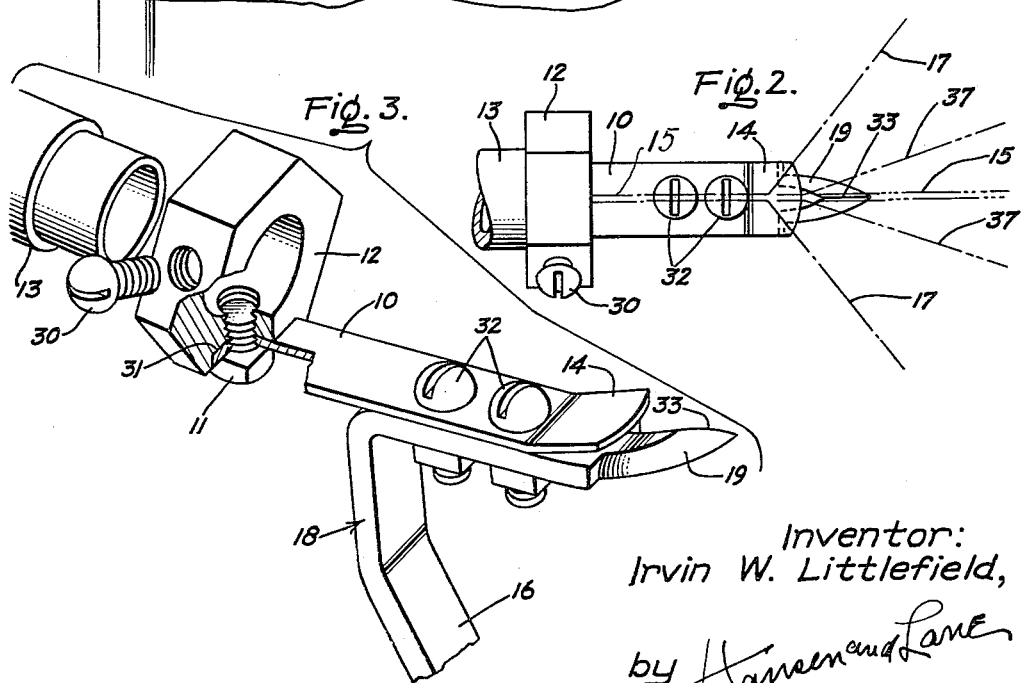
Inventor:
Irvin W. Littlefield,
by Hansen and Lane
Attorneys.

United States Patent Office 3,050,261
Patented Aug. 21, 1962

3,050,261
SPRAY PATTERN CONTROL MECHANISM FOR INSECTICIDE SPRAYER
Irvin W. Littlefield, San Jose, Calif., assignor of one-half to Robert Clayton Littlefield, Santa Clara, Calif.
Filed Apr. 24, 1961, Ser. No. 105,077
4 Claims. (Cl. 239—318)

The present invention relates to insecticide sprayers, and pertains more particularly to a mechanism for controlling the spray pattern discharged by such sprayers.

It is common practice to apply insecticide to plants and bushes by an insecticide sprayer attached to a lawn hose and comprising a container adapted to hold liquid insecticide, with a cap screwed onto the container and having a small aperture therein through which is discharged a fine, high velocity jet stream of water from the hose. This jet stream is directed transversely across an aperture provided at the top of a suction tube extending down into the container so as to reduce the air pressure above the tube aperture, and thus sucks up liquid insecticide from the container and entrains it in the jet stream. An inclined, spray-producing target is mounted in the path of the jet stream and breaks up the latter into fine droplets in the form of a spray.

The invention provides for adjustment of the spray pattern of such a sprayer by mounting an adjustable spray control mechanism for adjustment transversely of the emerging jet stream thereof.

Another object of the invention is to provide a spray control mechanism for varying the spray pattern of a hose-mounted garden insecticide sprayer.

A further object of the invention is to provide a spring biased, two-part spray control mechanism mounted in the path of a jet stream of mixed water and insecticide discharged by a garden insecticide dispenser, means being provide for moving the control mechanism transversely relative to such jet stream for varying the spray pattern produced by the impingement of the jet stream on the two parts of the control member.

A still further object of the invention is to provide a pair of spring biased target members with a handle member for moving the target members transversely relative to an impinging stream of water and entrained insecticide discharged by a hose-mounted insecticide dispenser to thereby vary the spray pattern produced by the impingement of such jet stream on said target members when the latter are selectively positioned in the path of such jet stream.

These, and other objects and advantages of the invention, will be apparent from the following description and the accompanying drawings wherein:

FIG. 1 is a side elevational view of a garden sprayer embodying the invention as it appears when gripped by the hands of an operator, the parts being shown in solid lines in their normal position, and in the two sets of broken lines, in displaced position for varying the spray pattern.

FIG. 2 is a fragmentary, plan view of the discharge end of the sprayer nozzle and the spray control mechanism mounted thereon, looking in the direction of the arrows 2—2 of FIG. 1, selected spray patterns being indicated in dash-dot and dash-two-dot lines, while the unintercepted jet stream is shown in dash-three-dot lines.

FIG. 3 is an enlarged, exploded, perspective view of the spray control mechanism of FIGS. 1 and 2 as it appears when removed from the sprayer nozzle, portions being broken away.

Briefly, the illustrated form of the invention comprises a two part spray control mechanism A comprising a leaf spring 10 secured by a screw 11 to the underside of an unthreaded nut 12 mounted at the forward end of the nozzle tube 13 of a conventional garden insecticide dispenser B. The outer or free end of the leaf spring 10 has an upwardly bent, first spray control portion 14 which is normally positioned in the path of a high velocity jet stream 15 of water discharged from the nozzle tube 15 of a conventional insecticide dispenser B. When the jet stream 15 strikes the first spray control portion 14 it is broken up into droplets in the form of a broad, fan shaped spray pattern bounded by the dash-dot lines 17 of FIG. 2.

Mounted directly beneath primary spray control portion 14 is a rigid member 18, having a narrow, pointed end portion 19 extending upwardly and outwardly beyond the primary spray control portion 14. The portion 19 comprises a secondary spray control portion. An actuating handle is provided by a downwardly bent rear or inner portion 16 of the lower member 18.

When the handle 16 is grasped by an operator's hand C and brought inwardly to the broken line position 16a of FIG. 1 it withdraws the primary control portion 14 from the path of the jet stream 15, and positions the secondary control portion 19 therein to thereby vary the spray pattern discharged by the dispenser B to that indicated by the dash-two-dot lines of FIG. 2. Still further rearward or inward movement of the handle to its position 16b of FIG. 1 also withdraws the secondary spray control portion 19 and leaves the jet stream 15 clear and unintercepted as indicated in dash-three-dot lines in FIG. 2.

Referring to the drawings in greater detail, the insecticide dispenser B itself is of a well known type, comprising a usual glass container 20, with a usual cap portion 21 screwed onto the threaded upper end thereof. The cover member 21 may be of die cast metal with an internally threaded, integral socket portion 22 into which the end fitting 23 of a usual garden hose 24 may be screwed for water tight connection thereto.

The cover 21 is constructed in a well known manner to discharge a small diameter, high velocity jet stream 15 of water from the hose 24 through the restricted nozzle tube 13. This jet stream 15 is discharged transversely across, and just clear of, a usual orifice, not shown, provided in the upper end of a suction tube 25, which extends downwardly within the container 20 to a low point in a quantity of liquid insecticide 27 contained therein. When open, a usual suction relief passage 28 communicates the interior of the nozzle tube 13 adjacent the upper end of the suction tube 25 with the atmosphere. The atmospheric end of the relief passage 28 is located conveniently for closing by the thumb 29 of one hand of an operator holding the dispenser B.

When the thumb 29 closes and seals off the suction relief passage 28, the air pressure within the nozzle tube 13 at the upper end of the suction tube 25 is thereby reduced in a well known manner, and thus causes insecticide from the container 20 to be sucked up through the suction tube 25 and entrained by the passing jet stream 15. A usual vent opening, not shown, is provided in the cover 21 to maintain atmospheric pressure on the liquid insecticide 27 in the container 20. The jet stream 15, with its entrained insecticide, is discharged at high velocity through the forward end of the nozzle tube 13. When the thumb 29 is removed from the relief passage 28, atmospheric air enters the nozzle tube 13 through the relief passage 28 and cuts off the upward flow of insecticide through the suction tube 25.

The unthreaded nut 12 for mounting the spray control mechanism A on the dispenser B is fitted onto the discharge end of the jet tube 13, and is secured in adjusted position thereon by a set screw 30 (FIGS. 2 and 3). The spray control mechanism A has a primary spray control portion, which, as illustrated, comprises the upwardly bent forward end portion 14 of the leaf spring 10. The rear or inner end of the spring 10 is fitted into a notch 31 (FIG. 3) provided therefor in the underside of the nut 12, and is secured therein by the mounting screw 11, which passes freely through a hole provided therefor in the spring strip 10 adjacent its rear end, and is screwed into a threaded hole provided therefor in the bottom of the notch 31.

The primary spray control portion 14 is normally positioned in the path of the jet stream 15 discharged through the nozzle tube 13, and is disposed at a slight acute angle to the path of the jet stream. The impingement of the high velocity jet stream 15 against this primary spray control portion 14 causes the jet stream 15 to be broken up into fine droplets, which are spread angularly upwardly and outwardly in a fan shaped spray pattern throughout a rather wide angle as indicated by the dash-dot lines 17 in the top plan view of FIG. 2.

The narrower, secondary spray control portion 19, as illustrated, comprises the narrow, forward end portion of the strip 18 of rigid, strip or band material, such as, for example, band steel. The member 18 is secured by small bolts 32 to the under side of the spring strip 10. The narrow secondary spray control portion 19 is pointed at its forward end 33, and extends forwardly and upwardly beyond the primary spray control portion 14. This secondary spray control portion 19 is positioned to lie centrally within the path of the jet stream 15 when the primary spray control portion 14 is swung downwardly clear of the jet stream.

The control handle 16 is formed integrally with the member 18, and extends downwardly from the leaf spring 10 just rearwardly of the two small bolts 32 which secure the member 18 to the spring 10. The handle 16 is disposed at an angle which permits movement of the spray control mechanism throughout its full operative range of adjustment from its normal solid line position of the handle 16, FIG. 1, through the broken line position 16a to the broken line position 16b of FIG. 1.

When the handle 16 is released, the spring strip 10 assumes its normal, solid line position of FIG. 1, wherein the primary spray control portion 14 is positioned in the path of the jet stream 15 to thereby provide the broad, fan shaped spray pattern indicated by the dash-dot lines 17 of FIG. 2.

In using the illustrated form of the invention, when the handle 16 is grasped by an operator's hand C and is drawn inwardly toward the insecticide container 20 sufficiently to move the primary spray control portion 14 downwardly, just clear of the jet stream 15 (broken lines FIG. 1), the jet stream 15 will then strike the narrow, pointed, secondary spray control portion 19, which breaks the jet stream into larger droplets, and spreads the resultant spray pattern through a lesser angle than did the primary spray control portion 14. This secondary spray pattern is defined by the dash-dot lines 37 of FIG. 2, and may be varied slightly even further by a fine adjustment of the extreme point of the secondary spray control portion 19 in the jet stream 15.

Since the droplets of the narrower spray pattern are deflected laterally less than are the droplets of the broader spray pattern 17 produced by the primary spray control portion 14, the former lose less of their forward velocity, so that this narrower spray pattern 37 carries farther than does the broader spray pattern 17 produced by impingement of the jet stream 15 against the primary spray control portion 14.

When the control handle 16 is moved still further inwardly toward the container 20, to its final inward position indicated by the broken lines 16b of FIG. 1, the secondary spray control member 19 is thereby withdrawn below, and entirely clear of, the jet stream 15, thereby allowing the latter to be directed without interception toward a desired point of application, for example, within the heart of a flower which could not be satisfactorily reached by spray, or as a drenching, solid stream along a branch or stem. The entirely unintercepted jet stream 15 will obviously carry to a much greater distance than either of the spray patterns 17 or 37 of FIG. 3.

By employing a spray control mechanism embodying the present invention an operator is provided with a wide choice of spray patterns which may be selectively employed as the occasion requires simply by changing the strength of his grip on the control handle 16 as required.

The invention provides a simple, inexpensive spray control mechanism which may be readily applied to any insecticide sprayer which is capable of discharging a high speed jet stream of water containing entrained insecticide. Obviously the mounting arrangement and structural details of the invention may be easily changed by an ordinarily skilled worker in the event it should be desired to mount the invention on an insecticide dispenser which was not adapted to receive the particular structure of the illustrated form of the invention.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A spray pattern control mechanism for mounting on an insecticide dispenser which is adapted to be connected to the discharge end of a garden hose, the dispenser being constructed to discharge a narrow high velocity jet stream of water received from the hose, such jet stream containing entrained insecticide from the dispenser and being directed along a fixed path; said spray control mechanism comprising a leaf spring member secured at one end thereof to the dispenser, a primary target member on the other end of said leaf spring member and positioned normally in the path of such jet stream and at an acute angle thereto, a secondary target member secured to said leaf spring, a terminal target portion of said secondary target member being narrower than said primary target member and extending endwise beyond the primary target member in the direction of such jet stream, and a control handle secured to the leaf spring for actuation by an operator, whereby, with the control handle in one position thereof the primary target member is positioned in the path of the jet stream for the production of a first, wide, fan shaped spray pattern by the impingement of the jet stream thereagainst, and with the control handle moved to a second position thereof the primary target member is withdrawn clear of the path of the jet stream and the narrower, terminal, target portion of the secondary target member is positioned in the jet stream for the production of a second, narrower, spray pattern by the impingement of the jet stream thereagainst.

2. A spray pattern control mechanism for mounting on an insecticide dispenser which is adapted to be connected to the discharge end of a garden hose, the dispenser being constructed to discharge a narrow high velocity jet stream of water received from the hose, such jet stream containing entrained insecticide from the dispenser and being directed along a fixed path; said control mechanism comprising a target support member mounted on the dispenser, a primary target member mounted on the target support and positioned, in one position of the target support member, in the path of such jet stream and at an acute angle thereto, a secondary target member pointed on its forward end and mounted with its forward, pointed end extending endwise beyond the primary target member, and control means for moving the primary target member into and out of the path of the jet stream, whereby, with the primary target member positioned in the path of the jet stream a first wide, fan shaped spray pattern is produced by the impingement of the jet stream thereagainst, and with primary target member withdrawn clear of the path of the jet stream, the pointed forward end portion of the secondary target member is positioned in the jet stream for the production of a second, narrower, spray pattern by the impingement of the jet stream thereagainst.

3. A spray pattern control mechanism for mounting on an insecticide dispenser which is adapted to be connected to the discharge end of a garden hose, the dispenser being constructed to discharge a narrow high velocity jet stream of water received from the hose, such jet stream containing entrained insecticide from the dispenser and being directed along a fixed path; said spray pattern control mechanism comprising a first target member mounted for movement into and out of the path of such jet stream and at an acute forward angle thereto, a second target member pointed on its forward end and mounted beyond the first target member in the direction of flow of such jet stream, and control means for moving the first target member into and out of the path of such jet stream, whereby, with the first target member positioned in the path of such jet stream a first wide, fan shaped spray pattern is produced by the impingement of such jet stream thereagainst, and with first target member withdrawn clear of the path of such jet stream, the pointed forward end portion of the second target member is positioned in such jet stream for the production of a second, narrower, spray pattern by the impingement of such jet stream thereagainst.

4. An arrangement according to claim 3 wherein the second target member is movable laterally toward and away from the path of the jet stream with the first target member withdrawn clear of the path of such stream.

References Cited in the file of this patent

UNITED STATES PATENTS

| | | |
|---|---|---|
| 357,799 | Wainwright | Feb. 15, 1887 |
| 748,227 | Smith | Dec. 29, 1903 |
| 2,329,231 | Thomas | Sept. 14, 1943 |
| 2,761,734 | Farmer | Sept. 4, 1956 |
| 2,841,442 | Skipwith | July 1, 1958 |